United States Patent [19]

Uppal

[11] 3,953,158
[45] Apr. 27, 1976

[54] AXIAL RETENTION OF DRIVE SHAFT IN A FLUID PRESSURE DEVICE
[75] Inventor: Sohan Uppal, Hopkins, Minn.
[73] Assignee: Eaton Corporation, Cleveland, Ohio
[22] Filed: Nov. 19, 1974
[21] Appl. No.: 525,255

[52] U.S. Cl. .............................. 418/61 B; 64/9 R
[51] Int. Cl.² ........................................... F16C 1/02
[58] Field of Search ............... 418/61 B; 64/9 R, 23

[56] References Cited
UNITED STATES PATENTS

| | | | |
|---|---|---|---|
| 3,549,285 | 12/1970 | Woodling | 418/61 B |
| 3,658,450 | 4/1972 | Woodling | 418/61 B |
| 3,692,440 | 9/1972 | Woodling | 64/9 X |
| 3,863,449 | 2/1975 | White | 418/61 B |

Primary Examiner—Samuel Scott
Assistant Examiner—Randall Heald
Attorney, Agent, or Firm—Teagno & Toddy

[57] ABSTRACT

Axial retention of the drive shaft is provided in a fluid pressure device of the type including an internally-toothed member, an externally-toothed member disposed eccentrically therein for relative orbital and rotational movement, and a drive shaft extending into a central bore defined by the externally-toothed member. The drive shaft has male splines and the externally-toothed member has female splines in the central bore, engaging the male splines. The front face of the externally-toothed member has a recess including a stop surface generally perpendicular to the axis of the device and the drive shaft has a shoulder extending radially outward and engaging the stop surface to limit the axial movement of the drive shaft into the central bore. Wear is minimized because the mating stop surface and shoulder are rotating at the same speed and, preferably, the shoulder "nutates" with respect to the stop surface.

6 Claims, 1 Drawing Figure

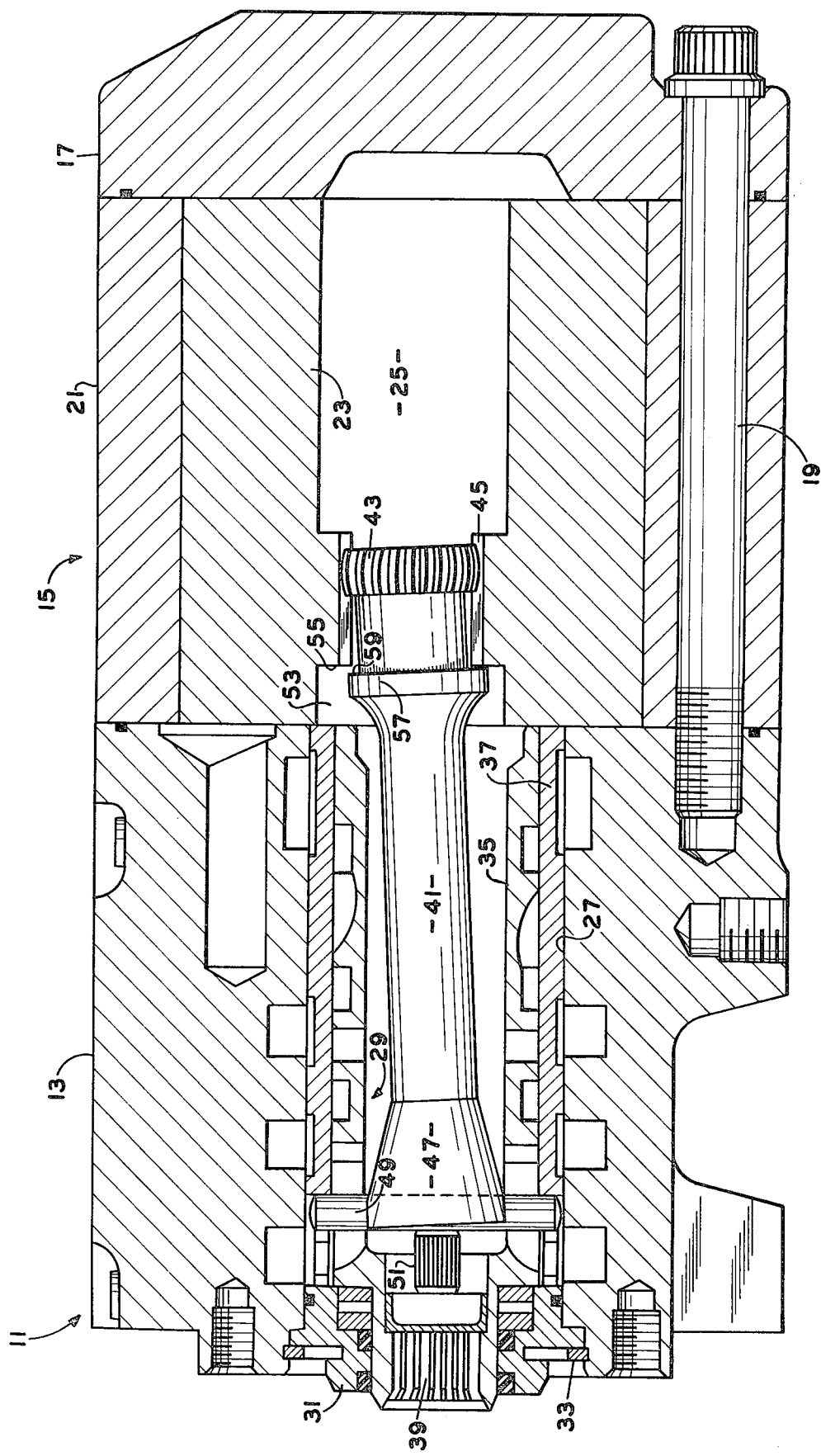

AXIAL RETENTION OF DRIVE SHAFT IN A FLUID PRESSURE DEVICE

BACKGROUND OF THE DISCLOSURE

The present invention relates to fluid pressure devices, and more particularly, to a means for limiting the axial movement of the drive shaft relative to the orbital gear set.

In general, fluid pressure devices of the type to which the present invention is adaptable include an internally-toothed ring member, an externally-toothed star member disposed therein for orbital and rotational movement, and a drive shaft in splined engagement with the star member and with either an output shaft (in the case of a hydraulic motor) or an input shaft (in the case of a hydraulic steering unit). The present invention is useful for any type of device which includes an orbital gear set and a drive shaft splined to the externally-toothed star member. It is well suited for use with hydraulic power steering units, and will be described in connection therewith.

In conventional hydraulic steering units, the orbital (or gerotor) gear set serves as fluid meter and is interconnected with the valve means by the drive shaft in such a manner that the drive shaft is axially movable relative to the externally-toothed star member.

The desirability of limiting axial movement of the drive shaft relative to the star member has long been recognized to insure both that the wear pattern between the male splines of the drive shaft and the female splines of the star member is stabilized and that the torque transmitted from the drive shaft to the star member is distributed over the full length of the mating male and female splines. It is also necessary to prevent the drive shaft from moving axially far enough to become disengaged from the drive pin linking the shaft to the spool valving.

One approach to limiting axial movement of the drive shaft has been to insert a spacer member within the central bore defined by the externally-toothed star member. The spacer member would engage the end of the drive shaft and extend to the end of the bore, contacting the inner surface of the cover or end cap bolted on the rearward end of the gerotor set.

The use of such spacers not only increases the cost and complexity of the manufacturing and assembly procedures, but also, any rotational and axial movement of the spacer member may increase the operating noise level of the hydraulic device. A further disadvantage of such spacers is that they effectively increase the mass of the star, thus increasing the kinetic energy of the star during its orbital motion and the resulting wear and vibration.

Accordingly, it is an object of the present invention to provide a fluid pressure device including a means for limiting axial movement of the drive shaft which requires no additional parts which serve no other function and no parts which are relatively free to move, thus causing noise.

Another approach is illustrated in U.S. Pat. No. 3,549,283, and the improvement thereon illustrated in U.S. Pat. No. 3,657,903. Both of the cited patents involve the use of a shoulder on the drive shaft which engages a wall within an annular groove defined in a "valve plate". As was noted in the second of the cited patents, its purpose was to minimize the amount of rotational and orbital rubbing between the shoulder and the "stop surface". However, even the improvement in the design permits a substantial amount of rubbing action between the rotating and orbiting shoulder portion on the drive shaft and the fixed stop surface in the annular groove. Also, the valve plate illustrated in the cited patents, could, in many cases, be eliminated if it is not needed to provide a stop surface.

Accordingly, it is another object of the present invention to provide a means for limiting axial movement of the drive shaft which substantially eliminates both rotational and orbital rubbing action between engaging surfaces, and the resulting wear of the rubbing surfaces.

It is a more specific object of the present invention to provide such a means which utilizes engagement of surfaces rotating and orbiting at substantially the same speed.

SUMMARY OF THE INVENTION

These and other objects of the present invention, which will become apparent upon a reading of the following detailed description, are accomplished by the provision of a fluid pressure device of the type including a housing, an internally-toothed member fixed with respect to the housing, an externally-toothed member eccentrically disposed within the internally-toothed member for relative orbital and rotational movement, the externally-toothed member defining a central bore and first and second oppositely disposed end surfaces. The drive shaft is disposed generally adjacent the first end surface and includes a shaft portion extending into the central bore and having male splines engaging female splines in the central bore. The externally-toothed member defines a stop surface adjacent the first end surface with the stop surface being oriented generally perpendicular to the axis of the fluid device and disposed radially outward from the central bore. The drive shaft includes a shoulder extending radially outward from the shaft and disposed axially inward from the male splines. The stop surface and the shoulder portion engage while both the drive shaft and the externally-toothed member rotate and orbit, thus limiting axial movement of the drive shaft with substantially no rubbing motion between the engaging surfaces.

DESCRIPTION OF THE PREFERRED EMBODIMENT

Referring now to the drawing FIGURE, which is for the purpose of illustrating the preferred embodiment of the invention, and not for limiting the same, there is shown an axial cross-section of an hydraulic power steering unit of the type illustrated and explained in greater detail in U.S. Pat. No. Re.25,126 assigned to the assignee of the present invention, to which reference should be made for additional details of the construction and operation of such devices.

The hydraulic power steering unit, generally designated 11, includes a housing 13, a fluid meter (or gerotor set) 15, and an end cap 17. The housing 13, fluid meter 15 and end cap 17 are fastened in tight engagement by a plurality of bolts 19.

The fluid meter 15 includes an internally-toothed member 21 held in a fixed relationship with respect to the housing 13 and end plate 17 by the bolts 19. Eccentrically disposed within the internally-toothed member 21 is an externally-toothed member 23 having a splined central opening 25. Housing 13 defines a substantially cylindrical, axially extending opening 27 within which is rotatably disposed a valve means 29. At the forward end of housing 13 is a recess within which is seated a front end cap 31, retained in place by a retaining ring 33.

Valve means 29 comprises a primary, rotatable valve member (spool) 35, and a cooperating, relatively rotatable follow-up valve member (sleeve) 37. Spool 35 terminates at its forward end at an internal splined portion 39 for connection to an externally splined shaft (not shown), such as may be attached to a steering wheel. The sleeve 37 is coupled to the spool 35 by means of a drive shaft 31 having, at its rearward end, a set of crowned male splines 43 in engagement with female splines 45 formed in the bore 25 of externally-toothed member 23.

At the opposite end of the drive shaft 41 is a bifurcated end portion 47 through which passes a transverse drive pin 49. The transverse drive pin 49 passes through an opening in the spool 35 and engages the sleeve 37 in a manner well known in the art, and which forms no part of the present invention. Disposed approximately at right angles to the drive pin 49 is a plurality of leaf springs 51 urging spool 35 and sleeve 37 toward the neutral position relative to each other.

Toward the front of the fluid meter 15, i.e., the end from which the drive shaft 41 extends, externally-toothed member 23 defines a recess 53 which is preferably annular. At the rearward end of recess 53 is a generally annular surface 55, oriented, in the subject embodiment, perpendicular to the longitudinal axis of the power steering unit 11, although it may be appreciated that the surface 55 may be oriented at a slight angle, such as two or three degrees, with respect to the axis.

Disposed axially inward from the male splines 43, the drive shaft 41 includes an enlarged shoulder portion 57 which engages surface 55, thereby limiting axial movement of the drive shaft 41 in rearward direction, i.e., toward the end cap 17. In order to accomplish this, the shoulder 57 includes a transverse, generally circular surface 59 which engages surface 55. The surfaces 55 and 59 rotate and orbit with respect to the axis of the device, while the surface 59 "wobbles" relative to the surface 55, i.e., the point of contact, or line of contact, between surfaces 55 and 59 moves around the surfaces circumferentially at the orbiting speed of the externally-toothed member 23. In the preferred embodiment, the diameter of the surface 59 is at least as great as the pitch circle of the female splines 45, and may be slightly greater than the base circle of the splines 45, in order to insure continued engagement of surfaces 55 and 59. It should be understood that the surface 59 may be oriented at a slight angle, such as two or three degrees, relative to the axis of the drive shaft 41.

It should be noted that the opening in the bifurcated end portion 47 of the drive shaft 41 cooperates with the transverse drive pin 49 to limit axial movement of the drive shaft toward the front of the fluid device. Thus, it is necessary to limit axial movement of the drive shaft 41 in the rearward direction only. It should be apparent, however, that in a different type of fluid pressure device, such as a fluid motor in which the drive shaft 41 has male splines at its frontward end in engagement with female splines of the output shaft, axial movement in both directions may be possible. Therefore, the shoulder 57 may include another stop surface, generally parallel to the surface 59, and the recess 53 may instead be an annular groove including another stop surface parallel to the surface 55, thus limiting axial movement of the drive shaft either forward or rearward.

The invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I now claim:

1. A fluid pressure device of the type including a housing, valve means disposed within said housing, an internally-toothed member fixed with respect to said housing, an externally-toothed member eccentrically disposed within said internally-toothed member for relative orbital and rotational movement and defining a longitudinal axis, said externally-toothed member defining a central bore, and first and second oppositely disposed end surfaces, a drive shaft disposed generally adjacent said first end surface and including a first shaft portion extending into said central bore, means connecting said first shaft portion and said externally-toothed member for common rotational and orbital movement, said externally-toothed member defining a first stop surface adjacent said first end surface and disposed generally perpendicular to said longitudinal axis and radially outward from said central bore, said first shaft portion including a shoulder portion extending radially outward therefrom, said first stop surface and said shoulder portion being in engagement during said rotational and orbital movement, to move at substantially the same speed, limiting axial movement of said drive shaft into said central bore.

2. A fluid pressure device as defined in claim 1 wherein said shoulder portion is generally cylindrical and defines a first diameter, said first diameter being at least as great as said central bore.

3. A fluid pressure device as defined in claim 1 wherein said means connecting said first shaft portion and said externally-toothed member comprises said central bore defining female splines having a pitch circle and said shaft portion defining male splines in engagement with said female splines, said shoulder portion including a generally circular second stop surface extending radially outward from said first shaft portion.

4. A fluid pressure device as defined in claim 3 wherein said second stop surface has a diameter at least as great as said pitch circle of said female splines.

5. A fluid pressure device as defined in claim 3 wherein said first and second stop surfaces orbit and rotate with respect to said longitudinal axis and said second stop surface wobbles relative to said first stop surface.

6. A fluid pressure device comprising:
 a. a housing;
 b. valve means rotatably disposed within said housing;
 c. an internally-toothed member fixed with respect to said housing;
 d. an externally-toothed member eccentrically disposed within said internally toothed member for relative orbital and rotational movement, said externally-toothed member defining a central bore having female splines, a front end surface, a rearward end surface, and a longitudinal axis;
 e. a drive shaft disposed generally frontward of said externally-toothed member and including a shaft portion extending into said central bore and having male splines in engagement with said female splines;

f. said central bore and said front end surface cooperating to define a generally annular recess including a stop surface oriented generally perpendicular to said longitudinal axis;

g. said drive shaft including a shoulder portion extending radially outward therefrom and disposed axially inward from said shaft portion; and h. said stop surface and said shoulder portion engaging as said drive shaft and said externally-toothed member rotate at substantially the same speed to limit axial movement of said drive shaft into said central bore.

* * * * *